UNITED STATES PATENT OFFICE 2,166,143

SULPHOCARBOXYLIC ESTERS

Benjamin R. Harris, Chicago, Ill.

No Drawing. Application November 15, 1937,
Serial No. 174,655

26 Claims. (Cl. 260—400)

My invention relates to a new class of chemical substances, and more in particular to a new class of chemical substances particularly adapted for use as detergents, wetting, penetrating, emulsifying, lathering, flotation and anti-spattering agents, and for frothing purposes.

In certain classes of industries, there is a need for a certain class of chemical substances usually used in relatively small quantities but capable of use in larger quantities to secure an effect principally the result of a wetting action such as at a water-oil interface. In the textile and dyeing industries, for example, there are many situations where a wetting or detergent action is imperative as, for example, in laundering, bleaching, mercerizing, dyeing or other operations, and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen. These problems are considered by some investigators as entirely a matter of wetting; in other words, by promoting greater attraction between the oleaginous and aqueous portions of the emulsion at the interfaces thereof. Although the problem is probably not one of wetting action entirely, it appears that certain compounds which in theory tend to concentrate at the water-oil interface have an effect upon the spattering behavior of margarine. This problem is discussed and a remedy disclosed in my prior Patent Nos. 1,917,250 and 1,917,256.

The principal object of my present invention is the provision of a new class of chemical substances capable of satisfactory use in connection with the problems hereinabove discussed.

Another object is the provision of a new class of chemical substances which are in general of relatively simple structure and can be cheaply made in commercial quantities.

Another object is the provision of a class of chemical substances of the character set forth which in the main will be innocuous and non-toxic, even though employed in such foods as margarine.

Another object is the provision of a new class of chemical substances having improved wetting characteristics.

Other objects and features of the invention will be apparent from a consideration of the following detailed description.

The substances of my invention are in general ester derivatives of lower molecular weight fatty acids with at least one unesterified sulphonic acid group in the fatty acid radical wherein the group esterified with the fatty acid has a lipophile radical with at least four carbon atoms. In certain circumstances there may be more than one unesterified sulphonic acid group in the fatty acid radical or there may be sulphonic acid groups that are esterified and other sulphonic acid groups that are not esterified, but in all cases there must be at least one unesterified sulphonic acid group in the fatty acid radical. The fatty acid radical with the free sulphonic acid group is of relatively low molecular weight and should contain not more than eight carbons.

Considering the compounds from another aspect, the molecule in each instance contains a lipophile group having at least four carbon atoms and a relatively low molecular weight hydrophile group which, in the class of compounds to which my present invention relates, are sulpho-carboxylic or sulpho-fatty acid radicals. From still another angle, the compounds may be considered as combinations of a lipophile group having at least four carbon atoms and a relatively low molecular weight sulpho-carboxylic or sulpho-fatty acid group. A more complete understanding of what may comprise the lipophile group and the particular character of the sulpho-carboxylic or sulpho-fatty acid group will be had as the detailed description progresses.

The function of the sulphonic acid group is to impart hydrophilic properties, that is, water wetting or water attracting properties, to the molecule as a whole. The groups which are esterified by the sulpho-carboxylic or sulpho-fatty acid are in general of a lipophile character. At times they may be strongly lipophilic and at other times moderately lipophilic. They may be of low molecular weight or of moderately high molecular weight, depending upon the purpose for which the substances may be used.

The lipophile groups entering into the molecular structure of my substances may be of simple character as, for example, in sulpho-acetates of straight chain alcohols such as hexyl alcohol, octyl alcohol, decyl alcohol, lauryl alcohol and the like, or of similar lower molecular weight supho-carboxylic acid esters of branched chain alcohols such as 2-ethyl hexanol-1, 2-butyl-octanol-1, and the like.

Others of the substances of my invention are lower molecular weight sulpho-carboxylic acid esters of polyhydroxy substances, at least one hydroxy group of the polyhydroxy substance being esterified with a carboxylic acid containing at least four carbon atoms and preferably between eight and eighteen carbon atoms. In addition to the compound mentioned above, other examples of compounds falling within the scope of my invention are as follows:

(1) Cetyl ether of monostearin sulphoacetate (sodium salt)

(2) Monolaurin sulphoacetate (sodium salt)

(3) Monopalmitin sulphobutyrate (sodium salt)

(4) Mono-palmitic acid ester of ethyleneglycol sulphopropionate (sodium salt)

(5) Di-sulphoacetic acid ester of mono-olein (disodium salt)

(6) Mono-palmitic acid ester of tri-methylene glycol sulphoacetate (sodium salt)

(7) α—stearic, β—benzoic, α'—sulphoacetic acid ester of glycerin (sodium salt)

(8) α—stearic, β—(p-sulphethoxy) benzoic, α'—sulphopropionic acid ester of glycerin (9)

(10) Monostearic acid ester of diethylene glycol sulpho-acetate (sodium salt)

(11) Mono-oleic acid ester of diethylene glycol sulphoacetate (sodium salt)

(12) Monostearin sulphoacetate (sodium salt)

(13) Octyl sulphoacetate (sodium salt)

(14) (Butyl diethylene glycol sulphoacetate (potassium salt)

(15) Oleyl sulphoacetate (sodium salt)

(16) Ricinoleyl sulphoacetate (potassium salt)

(17) Lauryl sulphoacetate (potassium salt)

(18) Sulphoacetate of 2-ethyl hexanol-1 (sodium salt)

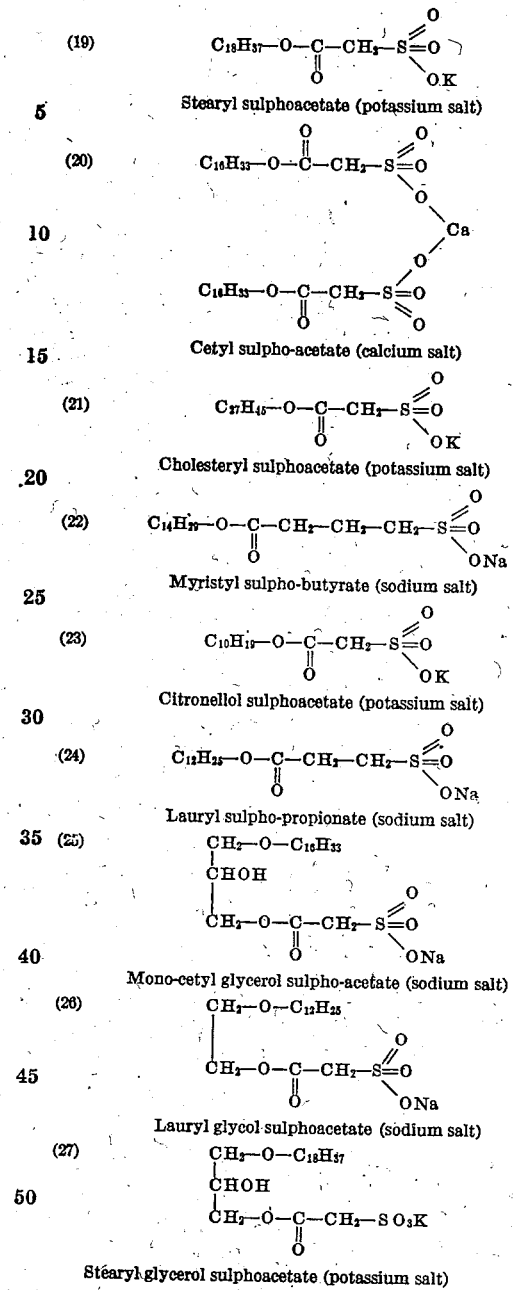

(19) Stearyl sulphoacetate (potassium salt)
(20) Cetyl sulpho-acetate (calcium salt)
(21) Cholesteryl sulphoacetate (potassium salt)
(22) Myristyl sulpho-butyrate (sodium salt)
(23) Citronellol sulphoacetate (potassium salt)
(24) Lauryl sulpho-propionate (sodium salt)
(25) Mono-cetyl glycerol sulpho-acetate (sodium salt)
(26) Lauryl glycol sulphoacetate (sodium salt)
(27) Stearyl glycerol sulphoacetate (potassium salt)

I may select many different types of compounds as lipophile groups, particularly those having at least eight carbon atoms although, for some purposes, the lipophile group or groups may contain as low as four carbon atoms. For example, the following compounds may be utilized as sources of lipophile groups, and sulpho-carboxylic acid esters thereof such as sulphoacetates may be prepared therefrom by procedures described more fully hereinafter: butyl alcohol, amyl alcohol, hexyl alcohol, octyl alcohol, nonyl alcohol, decyl alcohol, lauryl alcohol, myristyl alcohol, cetyl alcohol, oleyl alcohol, stearyl alcohol, ricinoleyl alcohol, palmitoleyl alcohol, ricin-oleic acid, hydroxy and α-hydroxy fatty acids such as α-hydroxy stearic acid, α-hydroxy lauric acid, ι-hydroxystearic acid, α-hydroxy palmitic acid, and the like, ceryl alcohol, carnaubyl alcohol, myricyl alcohol, and, in general, the higher molecular weight saturated and unsaturated aliphatic alcohols. I may also employ cyclo-aliphatic or ali-cyclic alcohols such as the sterols, as, for example, cholesterol, iso-cholesterol, phytosterol, as well as hydro-aromatic alcohols such as abietol. In addition, I may utilize such unsaturated alcohols as linalool, citronellol, geraniol and the like. It is, of course, obvious that the alcohols may be prepared in accordance with any desired method. For example, these alcohols may be prepared by the so-called Bouveault and Blanc method or, alternatively, by the reduction or catalytic reduction with hydrogen of natural or hydrogenated animal or vegetable fats and oils in accordance with well known practices. Again, the alcohols may be derived from synthetic processes such as by the oxidation of hydrocarbons or may be prepared by saponification of waxes and the like. Alternatively, they may be prepared by reduction of aldehydes or by the Grignard reaction. Still other methods known in the literature may likewise be employed if desired or deemed expedient. It is likewise apparent that mixtures of the foregoing or other alcohols may be utilized as, for example, the mixture of alcohols resulting from the hydrogenation of coconut oil or the free fatty acids of coconut oil. Lauryl alcohol comprises about 45% of the total alcohol mixture, the remaining alcohols running from C₆ to C₁₈. The sulpho-carboxylic esters of these mixtures of alcohols function in substantially the identical manner as the sulpho-carboxylic acid esters of the substantially pure alcohols. Again, mixtures of alcohols such as are present in the so-called sperm oil alcohols, as well as those present in wool-fat, may equally efficaciously be utilized. Indeed, these higher molecular weight alcohols are generally, if, indeed, not almost invariably, offered on the market in the form of mixtures of different alcohols. If desired for any specific purpose, special fractions which predominate in a certain particular higher molecular weight alcohol may be utilized or, if so desired, the sulpho-carboxylic esters may be prepared from a single, substantially pure alcohol. Since, obviously, for example, lauryl alcohol is the same irrespective of how it is prepared, the sulphoacetates or the like prepared therefrom are the same and function in like manner. Similarly, sulphoacetates of commercial mixtures of alcohols containing predominant amounts of, for example, lauryl alcohol, function essentially identically the same as the sulphoacetates of pure lauryl alcohol. It will be seen, therefore, that the source of the higher molecular alcohols from which my sulpho-carboxylic esters are prepared is entirely immaterial.

So far as the sulpho-carboxylic esters are concerned which are derivatives of polyhydroxy substances, I may select many different types of compounds as lipophile groups which are to be esterified with the polyhydroxy substances, principally compounds having lipophile radicals of relatively high molecular weight. For example, the following materials may be utilized as sources of lipophile groups: carboxylic or fatty acids such as butyric acid, caprylic acid, caproic acid, capric acid, saturated and unsaturated higher molecular weight aliphatic acids such as the higher fatty acids containing at least eight carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, montan wax, and carnauba wax and carboxylic acids derived, by oxidation and other methods, from petroleum, hydroaromatic acids such as naphthenic acid, abietic acid, hydroxy aromatic acids such as hydroxy benzoic acid, aromatic acids such as benzoic acid, naphthoic acid, and the like.

The polyhydroxy substances which provide the linkage between the lipophile group and the sulpho-carboxylic group may be selected from a large class and include glycerol; glycols such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol and dulcitol; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as for example:

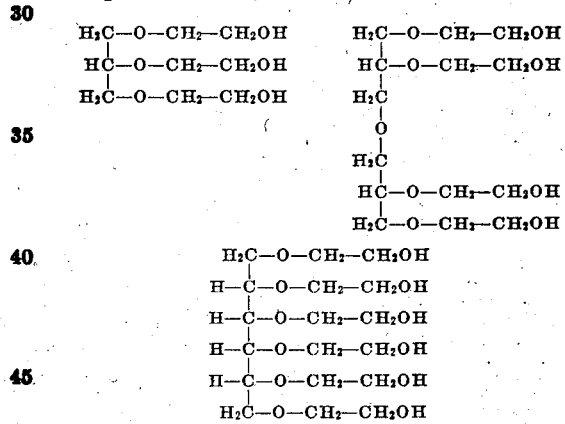

(For convenience, all hydroxyl groups are written facing one way.)

In those of my compounds which are sulpho-carboxylic esters of lipophile derivatives of polyhydroxy substances, the linkage between the ployhydroxy substance and the lipophile group need not be an ester linkage, although such is preferred, but it may be an ether linkage, as illustrated by compounds numbered (14), (25), (26) and (27) hereinabove.

From a study of the compounds which I list hereinabove, those skilled in the art will understand that I may use many different expedients for forming the compounds in so far as the dominant lipophile group and the relatively low molecular weight sulpho-fatty acid group are concerned. As stated, however, ester linkages are utilized between these two portions of the compound, and the skilled chemist will understand in general the most approved practices in securing this result. Numerous methods are also available for the introduction of the sulphonic acid group. In the case of aromatic sulphonic acids, of course, standard sulphonation procedures employed for producing aromatic sulphonic acids may be used, and, if desired, the lipophile group may be introduced subsequently.

In the case of aliphatic sulphonic acids, and, for that matter, even for the production of aromatic sulphonic acids, a reactive halogen may be caused to react with sodium sulphite or potassium sulphite or ammonium sulphite or some other sulphite in aqueous solution, if desired.

Another method is to introduce a sulph-hydryl or disulphide or some other suitable sulphur group and then oxidize to the sulphonic acid with nitric acid or a permanganate or some other oxidizing agent.

Still other methods will suggest themselves to the skilled chemist. Thus, for example, one or more esterifiable hydroxyl groups of a higher molecular weight alcohol or of a polyhydroxy derivative may be caused to react, under suitable conditions, with sulpho-acyl halides such as are represented by the formula:

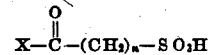

wherein X is halogen, particularly chlorine or bromine, and $n$ is a small whole number, at least one. The sulpho-acyl halides may also be of the type wherein the sulphonic group is attached to an intermediate carbon instead of to the terminal carbon as illustrated above.

Another method which may also be employed to produce the compounds of my invention involves reacting a straight chain higher molecular weight alcohol or a polyhydroxy compound or derivative thereof, there being at least one free hydroxy group present in the polyhydroxy nucleus, with a sulpho-acyl anhydride the sulphonic group of which may be attached to either the terminal or an intermediate carbon atom of the sulpho-acyl anhydride.

My preferred process comprises reacting a higher molecular weight alcohol, such as cetyl alcohol, or one or more free or esterifiable hydroxy groups of a polyhydroxy substance or derivative of a polyhydroxy substance, with a halogeno-carboxylic acid such as chloracetic or bromacetic acid, or with a halogeno-carboxylic acid halide such as chloracetyl chloride or bromacetyl bromide, to form a chloracetate or bromacetate, and then converting the latter into the sulphonic acid derivative by reaction with an alkali metal sulphite.

The following examples are illustrative of the preparation of compounds falling within the scope of my invention. It will be understood that said examples are given only by way of illustration and are not to be considered in any way limitative of the true scope of my invention.

EXAMPLE I.—*Monostearine sulphoacetate, Na salt*

(a) 700 parts of monostearine were heated with 175 parts of chloracetic acid for 3 hours at a temperature of 150-160 degrees C. in an atmosphere of $CO_2$ and with agitation. The reaction product was washed free of chloracetic acid with 4 times its own volume of water at 95 degrees C. and, to assist in separation, 100 parts of salt were added to the wash water.

(b) The product obtained in (a) was mixed with 500 parts of water, heated to about 60 degrees C., and then 175 parts of sodium sulphite were added. The temperature was maintained at 60-75 degrees C. with constant stirring for the first hour, then raised to 90-95 degrees C. and kept at that temperature for about three-quarters of an hour.

(c) To remove excess sulphite and other objectionable impurities, the product obtained in (b) was dispersed in 8 times its own volume of water at 80 degrees C., salted out with about 10% salt, allowed to settle and the wash water drained off. The process of dispersion, salting out and draining was repeated twice. On stirring and cooling, a white paste containing about 50% water was obtained. The water may be eliminated in any desired manner to produce a dry product.

EXAMPLE II.—*Distearine sulphoacetate*

400 parts of pure monostearine sulphoacetate were heated with 300 parts of stearyl chloride in 500 parts benzol at a temperature of 80-100 degrees C., until no further evolution of hydrochloric acid could be observed. The excess benzol was distilled off and the heating continued for another half hour at a slightly higher temperature. A brittle substance which could easily be ground into a powder was obtained. It dispersed readily in water.

EXAMPLE III.—*Distearine sulphoacetate, K salt*

(a) 200 parts of distearine were heated with 65 parts of chloracetic acid for 3 hours at 160-170 degrees C. When the reaction was completed the product was washed free of chloracetic acid and dried.

(b) 50 parts of the product obtained in (a) were mixed with 25 parts of potassium sulphite dissolved in 35 parts of water. 2 parts of potassium iodide were added and the mixture stirred and heated for about 10 hours on a water bath at 60-70 degrees C. and about 2 hours at 75-80 degrees C.

(c) To remove excess sulphite, 50 parts of the product obtained in (b) were dispersed in 500 parts of water, heated to 80 degrees C., and then salted out with 15% salt. The washing process was repeated several times. A paste containing about 50% water was obtained.

(d) For further purification, 150 parts of isopropyl alcohol were added to 10 parts of the paste, the mixture brought to the boiling point and filtered hot. The filtrate was allowed to cool and the precipitate that came down filtered off, washed several times with ether and then dried at room temperature. The product obtained dispersed readily in hot water.

EXAMPLE IV.—*Monostearine disulphoacetate, K salt*

(a) 500 parts of monostearine were heated with 500 parts of chloracetic acid at a temperature of 160 degrees C. for several hours using a stream of $CO_2$ for the purpose of agitation and to remove water of reaction. The heating was continued until the chlorine content corresponded to approximately 100% of monostearine dichloracetate.

(b) 35 parts of the washed and dried product obtained in (a) were mixed with 25 parts potassium sulphite in 40 parts of water. 4 parts of potassium iodide were added and the mixture stirred and heated on a water bath for about 8 hours at 70-80 degrees C.

(c) The product obtained in (b) was dispersed in 400 parts of water at 60-70 degrees C. and the dispersion saturated with sodium chloride. Very little separation took place. On chilling in an ice bath to 10 degrees C., the product could be isolated by gravity filtration. The process of dispersion, saturating with salt, chilling and gravity filtration was repeated a second and third time. A white paste containing about 50% water was obtained.

(d) To further purify the product obtained in (c) 10 parts of the latter were dispersed in 10 parts of water. 80 parts of hot isopropyl alcohol were added and the mixture brought to the boiling point and then filtered hot. On cooling and by the addition of a little more isopropyl alcohol, the sulphoacetate was precipitated. The precipitate was filtered off and dried at room temperature.

EXAMPLE V.—*Monostearic acid ester of diethylene glycol sulphoacetate, K salt*

(a) 500 parts of diethylene glycol monostearate, prepared by heating a mixture of one part of stearic acid with one part of diethylene glycol at a temperature of about 220 degrees C., using 0.1% KOH until the free fatty acid content is down to about ½ to 1%, was heated with 250 parts of chloracetic acid at 160-170 degrees C. for 4 hours. The product was washed free of chloracetic acid and dried.

(b) 50 parts of the product obtained in (a) were mixed with 35 parts of potassium sulphite and 50 parts water. 2 parts of potassium iodide were added and the mixture stirred and heated for about 10 hours at 70-75 degrees C. At the end of the 10 hours, 800 parts of hot isopropyl alcohol were added, the mixture brought to the boiling point and filtered hot. The alcohol solution was allowed to cool. The product was obtained in the form of a precipitate consisting of crystals of grayish leaflets. These dissolved readily in hot water.

EXAMPLE VI.—*Coconut mono fatty acid esters of diethylene glycol sulphoacetate, K salt*

(a) 400 parts of the fatty acid mono esters of diethylene glycol with mixed coconut oil fatty acids were heated with 260 parts of chloracetic acid for 3 hours at 160 degrees C. using a stream of $CO_2$ for agitation and removal of moisture.

(b) 200 parts of the washed and dried product obtained in (a) were mixed with 130 parts of potassium sulphite and 200 parts of water. 4 parts of potassium iodide were added and the mixture stirred and heated on a water bath at 60-70 degrees C. for about 10 hours. The reaction product was then dispersed in about 8 times its own volume of water heated to 60-70 degrees C. and salted out with 15% salt. The washing was repeated a second and third time. A thin paste, light in color and containing 60% water was obtained.

(c) The product may be used as finally obtained in (b) or may be purified by heating to the boiling point with 8 volumes of isopropyl alcohol, filtering hot and allowing the alcohol solution to cool. The precipitate which comes down is filtered off and dried at room temperature. The filtrate may be evaporated to dryness to recover the alcohol soluble substances.

EXAMPLE VII.—*Cholesteryl sulphoacetate, Na salt*

(a) 9 parts by weight of cholesterol, 9 parts by weight of brom acetyl bromide, and 40 parts by weight of benzene were heated under a reflux condenser for two hours at the boiling point of the mixture. The reaction mixture was then washed repeatedly with hot water until it was substantially free of acid and freed of benzene by distilling from a steam bath.

(b) 7 parts by weight of the above reaction product were then treated with 7 parts by weight of sodium sulphite, the latter being previously dissolved in 40 parts of hot water, the mass being heated for five hours at about 100 degrees C. with continuous, vigorous agitation.

(c) The above reaction mixtures was then washed several times with hot brine, until free of sulphites, dried, and finally purified by extracting the impurities with dry ethyl ether. An analysis showed that the final product was cholesteryl sulphoacetate, sodium salt, containing a small percentage of sodium chloride.

EXAMPLE VIII.—*Mono-lauryl glycerol sulphoacetate, Na salt*

(a) 115 grams of glycerin mono-chlorhydrin were mixed with 210 grams of sodium laurylate ($C_{12}H_{25}ONa$) and the mixture was maintained at between 75 degrees C. and 85 degrees C. until mono-lauryl glycerol was formed.

(b) About 250 grams of the resulting ether, washed free of sodium chloride if desired, was then mixed with 130 grams of chloracetyl chloride, the latter being added dropwise at about 38 degrees C. to 40 degrees C.

(c) The resulting product, washed free of hydrochloric acid, was then mixed with 1000 grams of sodium sulphite dissolved in 5000 cc. of water and heated to between 75 degrees C. and 85 degrees C. for one and one-half hours with constant stirring.

The resulting product, mono-lauryl glycerol sulphoacetate, Na salt

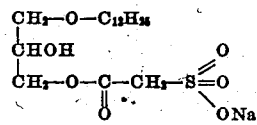

was recovered in purified form in substantially the same manner as described in the above examples.

EXAMPLE IX.—*Cetyl ethylene glycol sulphoacetate, K salt*

36 grams of the cetyl ether of ethylene glycol chloracetate

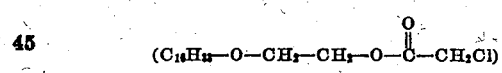

were mixed with 55 grams of potassium sulphite dissolved in 275 cc. of water and the mixture was heated at 85 degrees C. for about one and one-half hours.

The resulting product was freed of potassium chloride in substantially the manner set forth in the above examples.

EXAMPLE X.—*Lauryl sulphoacetate, K and Na salts*

(a) 500 grams of lauryl alcohol and 275 grams of chloracetic acid were heated together for two hours at 140 degrees C. to 150 degrees C. in an atmosphere of carbon dioxide gas. The reaction product was then washed free of excess chloracetic acid and, if desired, may be dried over anhydrous sodium sulphate.

(b) 520 grams of the lauryl chloracetate produced as described in part (a) were mixed with 410 grams of anhydrous potassium sulphite dissolved in 550 cc. of water and the entire mass was stirred vigorously and heated for four hours at 95 degrees C. to 97 degrees C. If desired, the reaction may be facilitated by the addition to the reaction mass of 5 grams of potassium iodide or 2 to 3 grams of lauryl potassium sulphoacetate or a mixture of both the iodide and the sulphoacetate. When the reaction was completed, the resulting mass was poured into 2500 cc. of cold water, with stirring, and the mixture was then cooled to 20 degrees C., whereupon the crude lauryl potassium sulphoacetate was filtered off.

(c) If it is desired to further purify the product, it may be dissolved in hot water (80 degrees C. to 90 degrees C.) to make approximately a 10% solution and the solution may then be cooled to 20 degrees C., at which temperature practically all of the lauryl potassium sulphoacetate crystallizes out. The crystals may then be filtered off and dried. They are of white, fluffy character.

(d) To prepare lauryl sodium sulphoacetate, the reaction was carried out in the same way as described in (b) except that the following proportions of ingredients were employed:

Lauryl chloracetate_____grams__ 500
Sodium sulphite_____do____ 365
Water _____cc___ 500

(e) Because of the greater solubility of the sodium salt of lauryl sulphoacetate than that of the potassium salt, it is somewhat more difficult to isolate the former. In the present case, the reaction mass of part (d) was mixed with between 5 and 6 volumes of hot water (80 degrees C. to 90 degrees C.) and was heated and stirred until essentially completely dispersed. About 15% of common salt was then added and the entire mass was then chilled and filtered. The dispersion in hot water and the salting-out operation were repeated four times. The paste which was obtained was then dried. It could be still further purified by admixture with 10 volumes of hot isopropyl alcohol, filtering, and cooling the alcohol solution to cause the lauryl sodium sulphoacetate to crystallize out.

EXAMPLE XI.—*Stearyl potassium sulphoacetate*

(a) Stearyl chloracetate was prepared as described in Example X (a), using the following proportions of ingredients:

Grams
Stearyl alcohol_____ 500
Chloracetic acid_____ 250

(b) 500 grams of stearyl chloracetate, as prepared in (a), were mixed with 350 grams of anhydrous potassium sulphite, dissolved in 600 cc. of water with or without the addition of 5 grams of potassium iodide. The mixture was stirred vigorously and heated for four hours at 95 degrees C.

(c) The resulting reaction mixture was then poured into between 3 and 4 volumes of hot water (80 degrees C. to 90 degrees C.) and between 10% and 15% of common salt were added to salt out the stearyl potassium sulphoacetate. The addition of hot water and the salting-out operation were repeated three times and the final paste obtained was dried and ground into a powder. By dissolving in isopropyl alcohol and crystallizing out therefrom, as described in Example X, a crystalline product was obtained.

EXAMPLE XII.—*Cetyl (palmityl) potassium sulphoacetate*

(a) The procedure described in Example X was followed employing 325 grams of cetyl alcohol and 155 grams of chloracetic acid for the preparation of the cetyl chloracetate; and 350 grams of cetyl chloracetate, 300 grams of anhydrous potassium sulphite and 400 cc. of water in the preparation of the cetyl potassium sulphoacetate.

(b) The purification of the cetyl potassium sulphoacetate after obtaining the crude filter cake, as described in Example X, was carried out by preparing a 5% hot aqueous solution of the crude sulphoacetate and chilling the solution to 20 degrees C., the cetyl potassium sulphoacetate crystallizing out, whereupon it was filtered off and dried.

EXAMPLE XIII.—*Decyl potassium sulphoacetate*

(a) Decyl chloracetate was prepared by admixing 70 grams of decyl alcohol, 100 cc. of benzol, and 70 grams of chloracetyl chloride and maintaining the mixture at between 70 degrees C. and 80 degrees C. until hydrochloric acid ceased to be evolved. The resulting decyl chloracetate was purified by adding water to the reaction mixture to decompose the excess chloracetyl chloride, the decyl chloracetate then being washed free of acid. The benzol was removed by distillation.

(b) 60 grams of decyl chloracetate were mixed with a solution containing 50 grams of anhydrous potassium sulphite, 0.5 gram of potassium iodide, and 100 cc. of water. The mixture was then heated, with stirring, for 4½ hours at 95 degrees C. When the reaction was complete, 1000 cc. of water were added whereupon a substantially clear solution was obtained. The solution was then chilled to between 10 degrees C. and 15 degrees C., the decyl potassium sulphoacetate crystallizing out. It was filtered off and dried, a white, crystalline powder being obtained.

EXAMPLE XIV.—*β-ethyl hexyl potassium sulphoacetate*

(a) The chloracetate of β-ethyl hexyl alcohol was prepared as described in Example XIII (a), using the following proportions of ingredients:

| | |
|---|---|
| β-ethyl hexyl alcohol | grams 77 |
| Chloracetyl chloride | do 70 |
| Benzol | cc 75 |

(b) 85 grams of β-ethyl hexyl chloracetate were mixed with a solution of 130 grams of anhydrous potassium sulphite and 2 grams of potassium iodide in 200 cc. of water and the resulting mixture was heated for between 5 and 6 hours at 90 degrees C.

(c) When the reaction was completed, 100 cc. of hot water were added to the reaction mass and it was then chilled to 20 degrees C. β-ethyl hexyl potassium sulphoacetate which crystallized out was, when filtered out and dried, a white powder.

EXAMPLE XV.—*Hydrogenated citronellol potassium sulphoacetate*

(a) 50 grams of hydrogenated citronellol were heated with 50 grams of chloracetyl chloride for about 4½ hours at 80 degrees C. or until there was no further evolution of hydrochloric acid. The excess chloracetyl chloride was decomposed by the addition of water and the hydrogenated citronellol chloracetate was washed free of chloracetic acid.

(b) 25 grams of hydrogenated citronellol chloracetate were mixed with a solution of 25 grams of anhydrous potassium sulphite dissolved in 25 cc. of water. The mixture was heated, with stirring, for about 5 hours or until a substantially clear solution was obtained. The stirring and heating were then continued for another hour whereupon 600 cc. of boiling isopropyl alcohol were added. The solution was then filtered to remove inorganic salts and the filtrate was evaporated to dryness. The product thus obtained was then treated with ether to remove any fatty substances which might be present.

Those skilled in the art are referred to my Patent No. 1,917,260, in which I disclose the use of some of the compounds of my present invention as anti-spattering agents for use in margarine. In this patent, I also treat of the manner of making some of these compounds.

Those of my substances which are freely soluble in water may be recovered from their solutions and from their water solutions in the customary manner by concentrating and crystallizing. As stated hereinabove, as the mass of the lipophile radical increases, solubility decreases and affinity for water is manifested by the dispersibility in water. From these dispersions, my substances may be readily recovered by "salting out" with suitable soluble electrolytes. Common salt is very satisfactory for this purpose in most cases. When salted out of an aqueous dispersion at temperatures ranging from 60 to 95 degrees C., the substances are obtained in the form of a paste with a water content ranging from approximately 25 to 75%. The more hydrophilic the substance, the greater the water content, and, of course, the salt is present in the water of the paste in approximately the same concentration in which it existed in the dispersion from which the paste was salted out.

Many of the compounds of my invention may be represented by the general formula $R-COO-R_1$ wherein $R$ denotes a lower molecular weight aliphatic radical containing at least one sulphonic acid radical and $R_1$ denotes a radical of a higher molecular weight mono- or polyhydric alcohol.

Many of the compounds of my invention may also be represented by the general formula

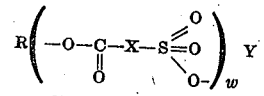

wherein $R$ is a radical comprising or containing a lipophile group with at least four carbon atoms and preferably from twelve to eighteen carbon atoms, $X$ is the carbon-hydrogen residue of the sulpho-carboxylic acid, $Y$ is a cation, and $w$ is a small whole number, at least one.

Still others of the compounds of my invention may be represented by the following general formula

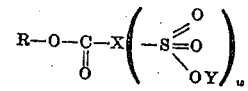

wherein $R$ is the residue of a polyhydroxy substance in which the hydrogen of at least one hydroxyl group is substituted by an alkyl or acyl group containing at least four carbon atoms and preferably between eight and eighteen carbon atoms, $X$ is the carbon-hydrogen residue of the sulpho-carboxylic acid, $Y$ is a cation, and $w$ is a small whole number, at least one.

I have previously referred to the fact that the lipophile group may in itself contain hydrophile radicals. For example, in the case of monostearin sulphoacetate, the hydroxy radical of the second glycerine carbon has a recognized hydrophilic character. The group as a whole, however, of which this hydroxy radical is a part, is dominantly lipophile, the single hydroxy radical in such a compound being insufficient to impart dominant hydrophile characteristics to the group as a whole. Moreover, in the case of a compound having an esterified sulphonic acid group, this sulphonic acid group will usually be found to possess a lipophile character or at least will not have a marked hydrophile character due to the additional group or radical which has been attached to the sulphonic acid group by esterification. When the character "R" is used in the formula, therefore, to represent a lipophile group, it is with the assumption that the group as a whole does not possess a hydrophilic character.

In so far as the sulpho-carboxylic or sulpho-fatty acid group of my compounds is concerned, I may employ a sulpho-acetate, sulpho-propionate, sulpho-butyrate, or other similar groups containing an unesterified sulphonic acid radical and, generally, not more than seven carbon atoms. In general, however, I have found that the sulpho-acetates particularly produce compounds of exceptionally valuable characteristics and they have the advantage of being relatively inexpensively produced from commercially available substances.

The terms "sulfo-carboxylic acid" and "sulpho fatty acid" as employed throughout the specification and claims are used in a strictly rigorous sense to mean an aliphatic compound which contains at least one

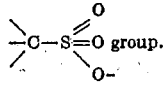 group.

The numerous examples given are clear in this feature.

In the event that the compounds of my invention are made by reacting the halogen derivatives with alkali metal sulphites or other soluble sulphites as well as thiosulphates, the corresponding alkali metal sulphonic acid derivative will be produced. I employ the term alkali metal to include the ammonium radical (NH₄). When prepared by other methods so that the compounds contain the sulphonic acid group (—SO₃H), the hydrogen thereof may be replaced by other cations such as calcium, magnesium, aluminum, zinc, amines, alkylolamines such as mono-, di- and triethanolamine and mixtures thereof, other organic nitrogenous bases such as pyridine and piperidine, tertiary amines, quaternary ammonium bases, etc. It will be understood that by the term "cation", as used throughout the specification and claims, is meant hydrogen and such other elements as are mentioned herein, and in general, atoms or radicals which are regarded as bearing a positive charge or capable of replacing acidic hydrogen.

It will be understood that the selection of the particular halogen derivatives which are utilized in the preparation of the halogen-carboxylic acid ester intermediate products will depend upon certain factors. Thus, while bromo- and iodo-derivatives, in general, react slightly more rapidly than do the chloro- derivatives, the relatively cheaper cost of the latter will generally justify their use from a purely economic standpoint.

My present application is a continuation-in-part of my copending applications, Serial No. 34,840, filed August 5, 1935, and Serial No. 121,563, filed January 21, 1937, which applications are continuations-in-part of my application, Serial No. 627,096, filed July 30, 1932. This latter application is in turn a continuation-in-part of my application Serial No. 481,349, filed September 11, 1930, now Patent No. 1,917,255, which was a continuation-in-part of my prior application Serial No. 475,622, filed August 15, 1930, now Patent No. 1,917,250.

The term "residue", as used throughout the specification and claims, is employed in its ordinarily understood chemical significance. For example, where one of the hydroxyl groups of glycerine is esterified with a fatty acid and another of the hydroxyl groups of the glycerine is esterified with a sulpho-carboxylic acid, that which remains of the glycerine molecule, for example

is the "residue" of the polyhydroxy substance, in this case glycerine.

Similarly, the term "carbon-hydrogen residue" of a sulpho-carboxylic acid is employed as in conventional chemical nomenclature. Thus, for example, if sulpho-acetic acid (HOOC—CH₂—SO₃H)

is esterified with glycerine, the group —CH₂— is to be considered as the "carbon-hydrogen residue" of the sulpho-acetic acid.

It will be understood that the term "lipophile group", as employed herein, is intended to cover any radical containing at least four carbon atoms and having an affinity for oleaginous material such as oils, fats, hydrocarbons and the like and may comprise radicals such as hydrocarbon radicals, acyl or alkyl groups derived from aliphatic or fatty acids or their corresponding alcohols, and the like. The hydrophile group or groups, in other words, the groups having an affinity for aqueous materials are, as fully set forth hereinabove, sulpho-carboxylic or sulpho-fatty acid groups.

Unless otherwise indicated, the term "higher", wherever employed in the claims, will be understood to mean at least eight carbon atoms and, concomitantly, the term "lower" will mean less than eight carbon atoms.

Whenever the term sulpho-carboxylic ester, sulpho-acetate, or the like expression is employed in the claims, it will be understood to cover the compounds irrespective of whether the hydrogen of the sulphonic acid is present as such or replaced by another cation.

What I claim as new and desire to protect by Letters Patent of the United States is:

1. Sulpho-carboxylic esters, suitable for use as assistants in the textile and related industries, corresponding to the general formula

in which R denotes an aliphatic radical, containing up to 7 carbon atoms and at least one sulphonic radical, and R₁ denotes a radical of an aliphatic alcohol containing at least 8 carbon atoms.

2. Sulpho-carboxylic esters, suitable for use as assistants in the textile and related industries, corresponding to the general formula

in which R denotes an aliphatic radical, containing up to 7 carbon atoms and at least one sulphonic radical, and R₁ denotes a radical of an aliphatic alcohol containing from 12 to 18 carbon atoms.

3. Sulpho-acetates of aliphatic alcohols containing at least 8 carbon atoms, suitable for use as assistants in the textile and related industries.

4. Sulpho-acetates of aliphatic alcohols containing from 12 to 18 carbon atoms, suitable for use as assistants in the textile and related industries.

5. Sulpho-carboxylic esters, suitable for use as assistants in the textile and related industries, corresponding to the general formula

in which R denotes a sulpho acetic acid radical and R₁ denotes a radical of a high molecular weight unsaturated alcohol.

6. A lower molecular weight sulpho-carboxylic acid ester represented by the general formula,

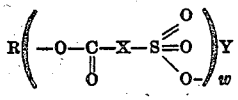

wherein R contains a lipophile group with at least four carbon atoms, X is the carbon-hydrogen residue of the lower molecular weight sulpho-carboxylic acid, Y is a cation, and w is a small whole number, at least one.

7. Sulpho-carboxylic esters, suitable for use as assistants in the textile and related industries, corresponding to the general formula

in which R denotes an aliphatic radical containing up to 7 carbon atoms and at least one sulphonic radical, and R₁ denotes a radical of a high molecular weight unsaturated alcohol.

8. Esters of lower molecular weight sulpho fatty acids and higher aliphatic alcohols.

9. Lauryl sulphoacetate.

10. Cholesteryl sulphoacetate.

11. A carboxylic ester of a lower molecular weight sulpho-fatty acid having at least one unesterified sulphonic acid group, and wherein the radical esterified with the sulpho-fatty acid includes a lipophile group with at least four carbon atoms.

12. A lower molecular weight sulpho-fatty acid ester of an aliphatic alcohol containing at least four carbon atoms.

13. A sulpho-acetic acid ester of an aliphatic alcohol containing at least four carbon atoms.

14. The process which comprises reacting a halogen-containig ester of a higher molecular weight unsaturated alcohol and a lower aliphatic monocarboxylic acid, the halogen being attached to the alkyl portion of the acyl group, with an alkali metal sulphite whereby the halogen is replaced by a sulphonic acid radical.

15. The process which comprises reacting a halogen-containing ester of a higher molecular weight alcohol and a lower aliphatic monocarboxylic acid, the halogen being attached to the alkyl portion of the acyl group, with an alkali metal sulphite whereby the halogen is replaced by a sulphonic acid radical.

16. The process which comprises reacting a higher molecular weight aliphatic alcohol with a lower halogen-containing aliphatic monocarboxylic acid derivative whereby a halogen-containing ester is produced, and then reacting the resulting ester with an alkali metal sulphite whereby the halogen is replaced by a sulphonic acid radical.

17. The process which comprises reacting an aliphatic alcohol containing from 12 to 18 carbon atoms with a lower halogen-containing aliphatic monocarboxylic acid derivative whereby a halogen-containing ester is produced, and then reacting the resulting ester with an alkali metal sulphite whereby the halogen is replaced by a sulphonic acid radical.

18. A lower molecular weight sulpho-carboxylic ester of a higher molecular weight branch chain alcohol containing at least eight carbon atoms.

19. A chemical substance represented by the general formula

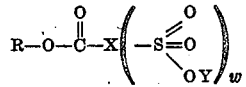

wherein R is a lipophile group with at least four carbon atoms, XCO is the acyl radical of a lower sulpho-fatty acid, Y is a cation and w is a small whole number, at least one.

20. A lower molecular weight sulpho-carboxylic acid ester of an alcohol containing at least four carbon atoms.

21. A lower molecular weight sulpho-carboxylic acid ester of an alcohol containing at least four carbon atoms, a sulphonic group of said sulpho-carboxylic acid radical being connected to the same carbon atom to which a carboxyl group of said sulpho-carboxylic acid radical is connected.

22. A lower molecular weight sulpho-carboxylic acid ester of an aliphatic alcohol containing at least four carbon atoms, a sulphonic group of said sulpho-carboxylic acid radical being connected to the same carbon atom to which a carboxyl group of said sulpho-carboxylic acid radical is connected.

23. A lower molecular weight aliphatic carboxylic acid ester of a higher molecular weight alcohol, a sulphonic radical being attached to a carbon atom of the lower molecular weight aliphatic carboxylic acid radical.

24. The process which comprises reacting a compound having a lipophile group with at least four carbon atoms and at least one esterifiable hydroxy group with a member selected from the group consisting of lower molecular weight halogeno-carboxylic acids and derivatives thereof to produce a halogeno-carboxylic acid ester of said first-mentioned compound, and then reacting the resulting ester with an alkali metal sulphite whereby the halogen is replaced by a sulphonic radical.

25. The process which comprises reacting an aliphatic alcohol containing at least four carbon atoms and at least one esterifiable hydroxy group with a member selected from the group consisting of lower molecular weight aliphatic halogeno-carboxylic acids and derivatives thereof to produce a halogeno-carboxylic acid ester of said alcohol, and then reacting the resulting ester with an alkali metal sulphite whereby the halogen is replaced by a sulphonic radical.

26. Lower molecular weight sulpho-carboxylic acid esters of lauryl alcohol.

BENJAMIN R. HARRIS.